US011835359B2

(12) United States Patent
Tsukamoto

(10) Patent No.: US 11,835,359 B2
(45) Date of Patent: Dec. 5, 2023

(54) APPARATUS, METHOD AND COMPUTER PROGRAM FOR GENERATING MAP

(71) Applicant: TOYOTA JIDOSHA KABUSHIKI KAISHA, Toyota (JP)

(72) Inventor: Mamoru Tsukamoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 17/491,800

(22) Filed: Oct. 1, 2021

(65) Prior Publication Data

US 2022/0107205 A1 Apr. 7, 2022

(30) Foreign Application Priority Data

Oct. 6, 2020 (JP) ................................ 2020-169279

(51) Int. Cl.
*G01C 21/00* (2006.01)
*G06T 11/20* (2006.01)
(Continued)

(52) U.S. Cl.
CPC ..... *G01C 21/3852* (2020.08); *G01C 21/3822* (2020.08); *G06F 18/24* (2023.01); *G06T 11/203* (2013.01); *G06V 20/182* (2022.01)

(58) Field of Classification Search
CPC ............ G01C 21/3852; G01C 21/3822; G06V 20/182; G06F 18/24; G06T 11/203
See application file for complete search history.

(56) References Cited

U.S. PATENT DOCUMENTS 7,898,437 B2 * 3/2011 Okada .................... G08G 1/166
701/472
8,600,655 B2 * 12/2013 Ishikawa .......... G08G 1/096783
382/104
(Continued)

FOREIGN PATENT DOCUMENTS

JP 2004086363 A * 3/2004 ............... G08G 1/16
JP 2004295597 A * 10/2004 ............... G08G 1/16
(Continued)

OTHER PUBLICATIONS

Hinz et al., 2003, "Automatic extraction of urban road networks from multi-view aerial imagery" (pp. 83-98). (Year: 2003).*
(Continued)

*Primary Examiner* — Manav Seth
(74) *Attorney, Agent, or Firm* — Dickinson Wright, PLLC

(57) ABSTRACT

An apparatus for generating a map includes a processor configured to detect a stop line of an intersection from a bird's-eye view image, detect from the bird's-eye view image an intersection area including an intersection and roads connected to the intersection, detect at least either one of an entry lane for entering the intersection and an exit lane for exiting the intersection in a road from which the stop line is extracted, of the roads, based on the ratio of the length of the stop line to the width of the road, and generate a lane network representing a connection relationship between lanes in the intersection so as to connect, for each of the roads, the entry lane of the road to the exit lane of another of the roads to which a vehicle is allowed to proceed from the entry lane of the road.

7 Claims, 6 Drawing Sheets

(51) Int. Cl.
  *G06V 20/10* (2022.01)
  *G06F 18/24* (2023.01)

(56) References Cited

U.S. PATENT DOCUMENTS

| | | | | |
|---|---|---|---|---|
| 11,486,727 B2* | 11/2022 | Igarashi | | G08G 1/0145 |
| 11,762,869 B1* | 9/2023 | Werner | | G06F 16/248 |
| | | | | 707/722 |
| 11,763,950 B1* | 9/2023 | Larson | | G16H 10/60 |
| | | | | 705/3 |
| 2006/0217879 A1* | 9/2006 | Ikeuchi | | G01C 21/3844 |
| | | | | 701/409 |
| 2008/0123902 A1* | 5/2008 | Park | | G06V 20/588 |
| | | | | 382/104 |
| 2010/0169013 A1* | 7/2010 | Nakamura | | G08G 1/0969 |
| | | | | 701/469 |
| 2017/0028995 A1* | 2/2017 | Mori | | B60W 60/0053 |
| 2018/0148052 A1 | 5/2018 | Suto et al. | | |
| 2019/0347492 A1* | 11/2019 | Morimura | | B60W 40/04 |
| 2021/0182575 A1* | 6/2021 | Murakami | | G06V 20/588 |
| 2021/0342586 A1* | 11/2021 | Fleisig | | G06V 20/182 |
| 2022/0155097 A1* | 5/2022 | Tsukamoto | | G01C 21/3852 |
| 2022/0219700 A1* | 7/2022 | Tsukamoto | | B60W 60/0025 |
| 2023/0014725 A1* | 1/2023 | Igarashi | | G06V 10/751 |

FOREIGN PATENT DOCUMENTS

| | | | | |
|---|---|---|---|---|
| JP | 3711518 B2 * | 11/2005 | | G08G 1/017 |
| JP | 2010026875 A | 2/2010 | | |
| JP | 2015004814 A | 1/2015 | | |
| JP | 2018087763 A | 6/2018 | | |
| JP | 2020008681 A | 1/2020 | | |

OTHER PUBLICATIONS

Zhang et al., 2016, "A lane-level road network model with global continuity" (pp. 32-50). (Year: 2016).*

Bastani et al., 2018, "RoadTracer: Automatic Extraction of Road Networks from Aerial Images" (pp. 1-9). (Year: 2018).*

* cited by examiner

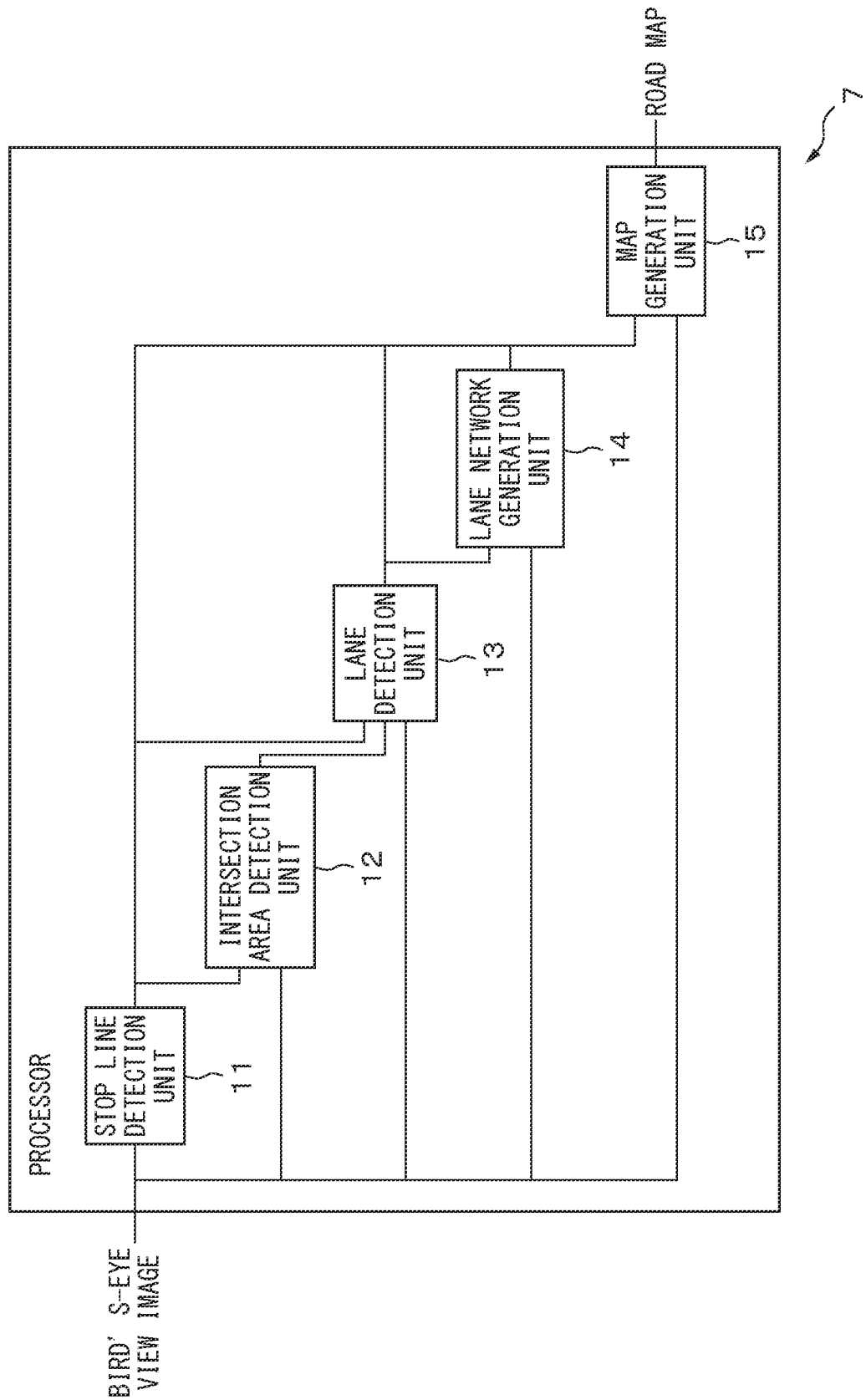

APPARATUS, METHOD AND COMPUTER PROGRAM FOR GENERATING MAP

FIELD

The present invention relates to an apparatus, a method, and a computer program for generating a map from an image.

BACKGROUND

A technique has been proposed to generate a map of lane level from an image representing roads (see, e.g., Japanese Unexamined Patent Publication No. 2015-4814). A device for generating a lane map disclosed in Japanese Unexamined Patent Publication No. 2015-4814 extracts center point groups of travel lanes of vehicles from each of local images. The local images are captured by image capturing means mounted on vehicles for taking pictures of surroundings of the vehicles, and are given positional information of the vehicles. The device divides the center point groups of travel lanes into center point groups each representing a single travel lane, based on a wide-area image obtained by collating and combining the local images. For each link in a road network, the device further generates center lines of non-branching travel lanes corresponding to the link, using a non-branching lane model. At each node in the road network, the device also generates center lines of branching lanes for branching to connectable non-branching travel lanes, using a branching lane model.

SUMMARY

In the above-described technique, vehicles actually travel on roads and obtain with cameras mounted thereon video images, which are used to generate a map including information of lane level. Thus generating a map requires extremely many man-hours and costs. Additionally, when a set of exit, intermediate, and entry points of a travelable route passing through an intersection is generated, the result of a statistical analysis of trajectories of the vehicles is used to obtain a pair of connectable exit and entry points. Thus, regarding an intersection none of the vehicles has actually passed, the connection relationship between travelable lanes of roads connected thereto cannot be obtained.

It is an object of the present invention to provide an apparatus for generating a map that can automatically extract the connection relationship between travelable lanes of roads connected to an intersection, based on a bird's-eye view image.

As an aspect, an apparatus for generating a map is provided. The apparatus includes a processor configured to detect a stop line of an intersection from a bird's-eye view image, detect from the bird's-eye view image an intersection area including an intersection and roads connected to the intersection, detect at least either one of an entry lane for entering the intersection and an exit lane for exiting the intersection in a road from which the stop line is extracted, of the roads, based on the ratio of the length of the stop line to the width of the road, and generate a lane network representing a connection relationship between lanes in the intersection so as to connect, for each of the roads, the entry lane of the road to the exit lane of another of the roads to which a vehicle is allowed to proceed from the entry lane of the road.

It is preferable that the processor is further configured to detect a reference point in the intersection from the bird's-eye view image, and the processor detects the intersection area so that the position where one of scan lines drawn radially from the reference point crosses the stop line is included in the intersection area.

In this case, the processor preferably detects a road marking indicating the intersection from the bird's-eye view image, and sets the reference point at the position where the detected road marking is represented.

Alternatively, the processor preferably extracts road areas representing roads from the bird's-eye view image, thins or skeletonizes the extracted road areas to generate a network representing a connection relationship between the roads, and sets the reference point at a node of an order not less than three in the generated network.

In addition, the processor preferably inputs the intersection area into a classifier to generate the lane network of the intersection area, the classifier having been trained to output, for each of the roads, a connection relationship between the entry lane of the road and an exit lane of another of the roads to which a vehicle is allowed to proceed from the entry lane of the road.

As another aspect, a method for generating a map is provided. The method includes detecting a stop line of an intersection from a bird's-eye view image; detecting from the bird's-eye view image an intersection area including an intersection and roads connected to the intersection; detecting at least either one of an entry lane for entering the intersection and an exit lane for exiting the intersection in a road from which the stop line is extracted, of the roads, based on the ratio of the length of the stop line to the width of the road; and generating a lane network representing a connection relationship between lanes in the intersection so as to connect, for each of the roads, the entry lane of the road to the exit lane of another of the roads to which a vehicle is allowed to proceed from the entry lane of the road.

As still another aspect, a non-transitory recording medium that stores a computer program for generating a map is provided. The computer program includes instructions causing a computer to execute a process including detecting a stop line of an intersection from a bird's-eye view image; detecting from the bird's-eye view image an intersection area including an intersection and roads connected to the intersection; detecting at least either one of an entry lane for entering the intersection and an exit lane for exiting the intersection in a road from which the stop line is extracted, of the roads, based on the ratio of the length of the stop line to the width of the road; and generating a lane network representing a connection relationship between lanes in the intersection so as to connect, for each of the roads, the entry lane of the road to the exit lane of another of the roads to which a vehicle is allowed to proceed from the entry lane of the road.

The apparatus according to the present invention has an advantageous effect of being able to automatically extract the connection relationship between travelable lanes of roads connected to an intersection, based on a bird's-eye view image.

BRIEF DESCRIPTION OF DRAWINGS

FIG. 2 is a functional block diagram of a processor of the apparatus for generating a map according to an embodiment.

DESCRIPTION OF EMBODIMENTS

Hereinafter, an apparatus for generating a map as well as a method and a computer program therefor used by the apparatus will be described with reference to the drawings. The apparatus detects a stop line of an intersection and an intersection area including the intersection and roads connected to the intersection from a bird's-eye view image representing roads. The apparatus also detects at least either one of an entry lane for entering the intersection and an exit lane for exiting the intersection in a road from which the stop line is extracted, of the roads connected to the intersection, based on the ratio of the length of the stop line to the width of the road. The apparatus then generates a lane network representing a connection relationship between lanes in the intersection so as to connect, for each of the roads connected to the intersection, the entry lane of the road to the exit lane of another of the roads to which a vehicle is allowed to proceed from the entry lane of the road.

In the embodiment or modified example described below, a bird's-eye view image that is a target for a map generation process and that represents roads may be, for example, an image of the ground taken from above and identifiably representing individual road markings on the roads, e.g., an image representing a high-resolution satellite or aerial photograph. In the following description, a target bird's-eye view image for the map generation process may be simply referred to as an image.

Figure 1:
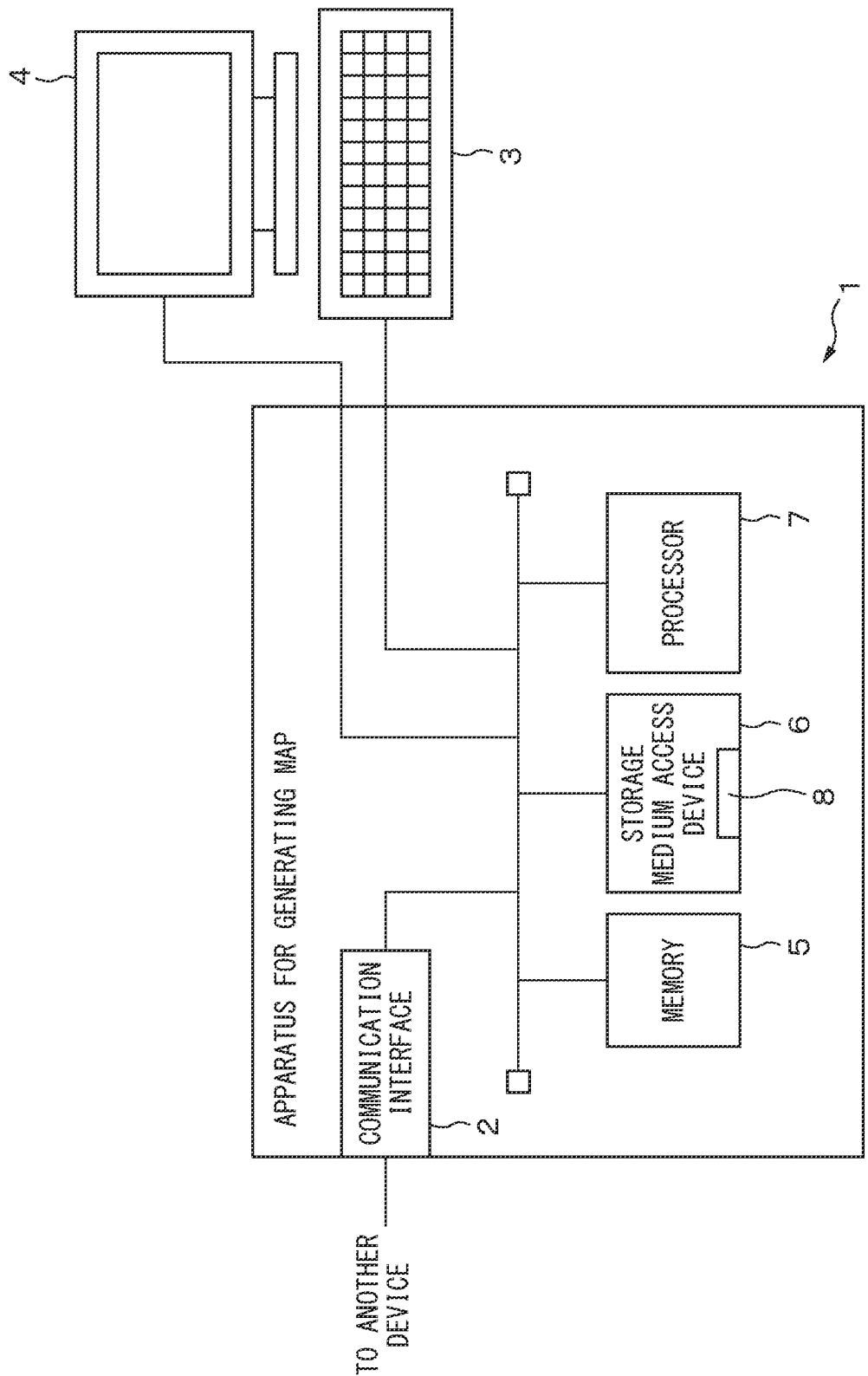
FIG. 1 illustrates the hardware configuration of an apparatus for generating a map according to an embodiment.

FIG. 1 illustrates the hardware configuration of an apparatus for generating a map according to an embodiment. As illustrated in FIG. 1, an apparatus 1 for generating a map includes a communication interface 2, an input device 3, a display 4, a memory 5, a storage medium access device 6, and a processor 7.

The communication interface 2 includes a communication interface and a control circuit thereof that are compliant with a communication standard, such as Ethernet (registered trademark), and used for connection to a communication network. The communication interface 2 receives various types of information or data from another device (not illustrated) connected via the communication network, and passes them to the processor 7. The data received by the communication interface 2 may include an image that is a target for the map generation process and that represents roads, and information indicating the geographical area represented in the image, such as the latitude and longitude of a predetermined position in the region represented in the image (e.g., its upper left end or center) and the real-space horizontal and vertical sizes and the bearing of this region. The communication interface 2 may output to another device via the communication network a road map, which is an example of map information, obtained by executing the map generation process and received from the processor 7.

The input device 3 includes, for example, a keyboard and a pointing device, such as a mouse. The input device 3 generates an operation signal in response to an operation by a user, such as an operation for selecting a target image of the map generation process, for giving instructions to start execution of the map generation process, or for causing a generated road map to appear on the display 4, and outputs the operation signal to the processor 7.

The display 4 includes, for example, a liquid crystal display or an organic electroluminescent display. The display 4 displays data for display received from the processor 7, such as data representing candidates for a target image for the map generation process, or a generated road map or a portion thereof.

The input device 3 and the display 4 may be integrated into a single device like a touch screen display.

The memory 5, which is an example of a storage unit, is composed of, for example, a readable-writable semiconductor memory and a read-only semiconductor memory. The memory 5 stores, for example, a computer program for the map generation process executed by the processor 7; various types of data used in this process, such as a set of parameters for specifying a classifier used in the map generation process; and various types of data generated during execution of this process. The memory 5 may further store a target image for the map generation process and information indicating the geographical area represented in the image. The memory 5 may further store a generated road map.

The storage medium access device 6 accesses a storage medium 8, such as a magnetic disk, a semiconductor memory card, and an optical storage medium. The storage medium access device 6 together with the storage medium 8 constitutes another example of a storage unit. The storage medium access device 6 reads data stored in the storage medium 8, such as a computer program for the map generation process to be executed on the processor 7 or a target image for the map generation process, and passes it to the processor 7. Alternatively, the storage medium access device 6 may receive a generated road map from the processor 7, and write the road map to the storage medium 8.

The processor 7, which is an example of a processing unit, includes, for example, one or more CPUs and a peripheral circuit thereof. The processor 7 may further include arithmetic circuits for numerical operation, graphics processing, and logical operation. The processor 7 controls the overall operation of the apparatus 1, and executes the map generation process on an image that is a target for this process and that represents roads.

FIG. 2 is a functional block diagram of the processor 7, related to the map generation process. As illustrated in FIG. 2, the processor 7 includes a stop line detection unit 11, an intersection area detection unit 12, a lane detection unit 13, a lane network generation unit 14, and a map generation unit 15. These units included in the processor 7 are, for example, functional modules implemented by a computer program executed on the processor 7, or may be dedicated arithmetic circuits provided in the processor 7.

The stop line detection unit 11 detects individual stop lines represented in an image. To achieve this, for example, the stop line detection unit 11 inputs the image into a classifier that has been trained to detect stop lines from an image, thereby detecting individual stop lines. As such a classifier, the stop line detection unit 11 may use, for example, a "deep neural network" (DNN) having a convolutional neural network (CNN) architecture. More specifically, such a classifier may be, for example, a CNN for semantic segmentation, e.g., a fully convolutional network (FCN), U-Net, or PSPNet, or a CNN for instance segmentation, e.g., Mask-RCNN. Alternatively, such a classifier may be a CNN for object detection, e.g., Single Shot MultiBox Detector (SSD) or Faster R-CNN. Additionally, such a classifier may be one conforming to a machine learning technique other than a neural network, e.g., AdaBoost. Alternatively, the stop line detection unit 11 may detect stop lines in accordance with a technique other than machine learning, such as template matching.

The stop line detection unit 11 notifies information indicating the position and size of the detected individual stop lines in the image to the intersection area detection unit 12, the lane detection unit 13, and the map generation unit 15.

The intersection area detection unit 12 detects, for each intersection represented in an image, a predetermined area including the intersection and roads connected to the intersection (hereafter simply an "intersection area"). To achieve this, for example, the intersection area detection unit 12 inputs the image into a classifier that has been trained to detect a road marking indicating the center of an intersection (hereafter, an "intersection mark") and road areas representing roads from an image, thereby detecting individual intersection marks and road areas. As such a classifier, the intersection area detection unit 12 may use a classifier similar to that described in relation to the stop line detection unit 11, e.g., a CNN for semantic segmentation or instance segmentation. When a CNN for semantic segmentation is used as the classifier, the intersection area detection unit 12 may apply a clustering process or a labeling process to a set of pixels representing intersection marks to classify the set of pixels into individual intersection marks. The classifier used by the stop line detection unit 11 may be trained in advance to detect not only stop lines but also intersection marks and road areas from an image. In this case, the intersection area detection unit 12 receives information indicating the positions and sizes of intersection marks and road areas in the image together with information indicating those of stop lines from the stop line detection unit 11.

Upon detection of intersection marks and road areas, the intersection area detection unit 12 detects an intersection area for each detected intersection mark in accordance with the following procedure.

The intersection area detection unit 12 sets a reference point of the intersection at a predetermined point in the detected intersection mark in the image, e.g., at the centroid position of the intersection mark. The intersection area detection unit 12 then sets scan lines drawn radially from the reference point at equiangular intervals, and detects, for each scan line, the position where the scan line crosses a border between a road area and another region (hereafter, a "road edge") or a stop line extended to a road edge, as an outer edge of the intersection area. Determining outer edges of an intersection area in this way results in the intersection area including stop lines of roads connected to the intersection, facilitating determination of the number of lanes included in each road connected thereto.

Regarding a scan line that does not cross a stop line nor an extended line like that described above between the reference point of the intersection and a preset farthest end, the intersection area detection unit 12 detects the position of the farthest end as a candidate of an outer edge of the intersection area. In a road where the position of the farthest end is a candidate of an outer edge, the intersection area detection unit 12 gradually brings an outer-edge candidate line on which candidates of the outer edge align nearer to the reference point. Then, when the length of the outer-edge candidate line becomes longer than the immediately preceding length thereof at a predetermined ratio or more, it sets the outer edge of the intersection area on a line farther from the reference point than this outer-edge candidate line by a predetermined number of pixels. In this way, the intersection area detection unit 12 can include in an intersection area a portion where a road having no stop line is connected to an intersection. This allows for appropriately setting a lane network related to the road having no stop line.

The intersection area detection unit 12 detects an area surrounded by a line connecting the outer edges set on the roads connected to the intersection as the intersection area.

Figure 3C:
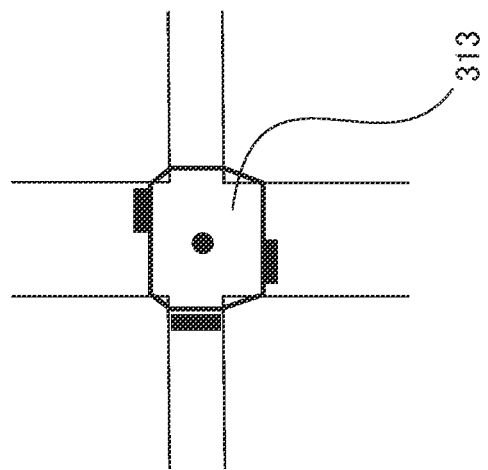
FIG. 3C is a diagram for briefly explaining detection of an intersection area.
Figure 3B:
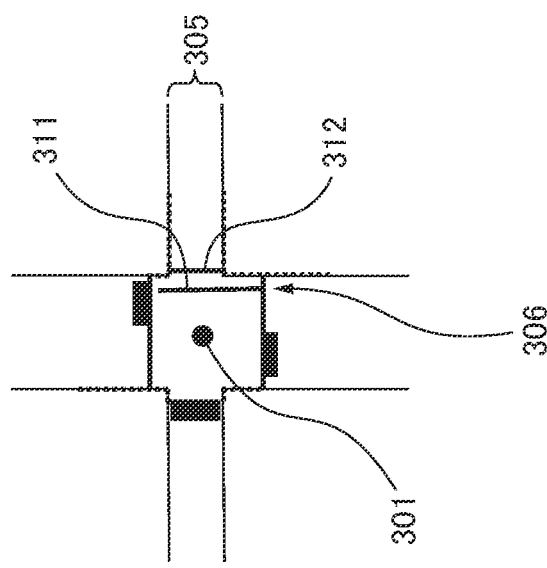
FIG. 3B is a diagram for briefly explaining detection of an intersection area.
Figure 3A:
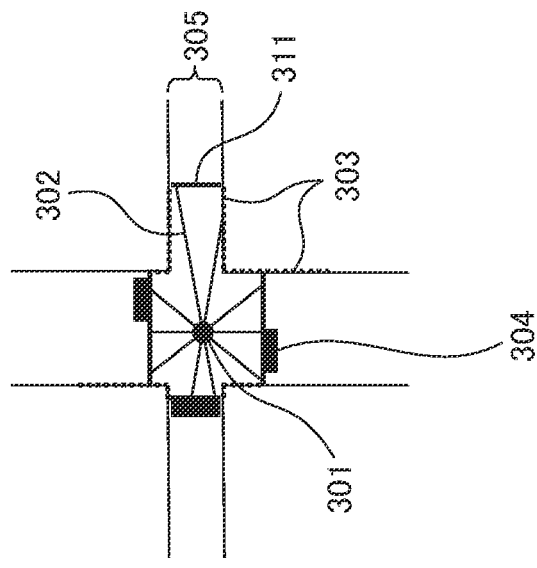
FIG. 3A is a diagram for briefly explaining detection of an intersection area.

FIGS. 3A to 3C are diagrams for briefly explaining detection of an intersection area. As illustrated in FIG. 3A, scan lines 302 are set radially from a reference point 301 in an intersection, and the position where each scan line 302 crosses a road edge 303 or a stop line 304 extended to a road edge 303 is set as an outer edge of an intersection area. However, in a road 305 on the right of the reference point 301, an outer-edge candidate line 311 of the intersection area is set at the position of a preset farthest end because it has no stop line.

As illustrated in FIG. 3B, when the outer-edge candidate line in the road 305 is gradually brought nearer to the reference point 301, at a position 306 the length of this line becomes longer at a predetermined ratio or more than the immediately preceding length thereof. Thus an outer-edge candidate line farther from the reference point 301 than the position 306 by a predetermined number of pixels is set in the road 305 as an outer edge 312 of the intersection area.

As illustrated in FIG. 3C, the area surrounded by outer edges set in the respective roads is an intersection area 313 in the end.

There is an intersection having no intersection mark. The intersection area detection unit 12 may set a reference point of an intersection having no intersection mark in accordance with the following procedure.

The intersection area detection unit 12 applies a skeletonizing process to road areas detected by a classifier to obtain a skeleton network representing the connection relationship between roads. This causes the roads to be represented by single lines, and thus an intersection becomes a node where lines cross. The intersection area detection unit 12 sets reference points at nodes of orders not less than three. Instead of skeletonizing road areas, the intersection area detection unit 12 may execute a thinning process on the road areas to obtain a thinned network representing the connection relationship between roads. In this case also, the intersection area detection unit 12 may similarly set reference points at nodes of orders not less than three. Based on such a network, the intersection area detection unit 12 can set a reference point in an intersection having no intersection mark, and thus appropriately set an intersection area for such an intersection.

Figure 4:
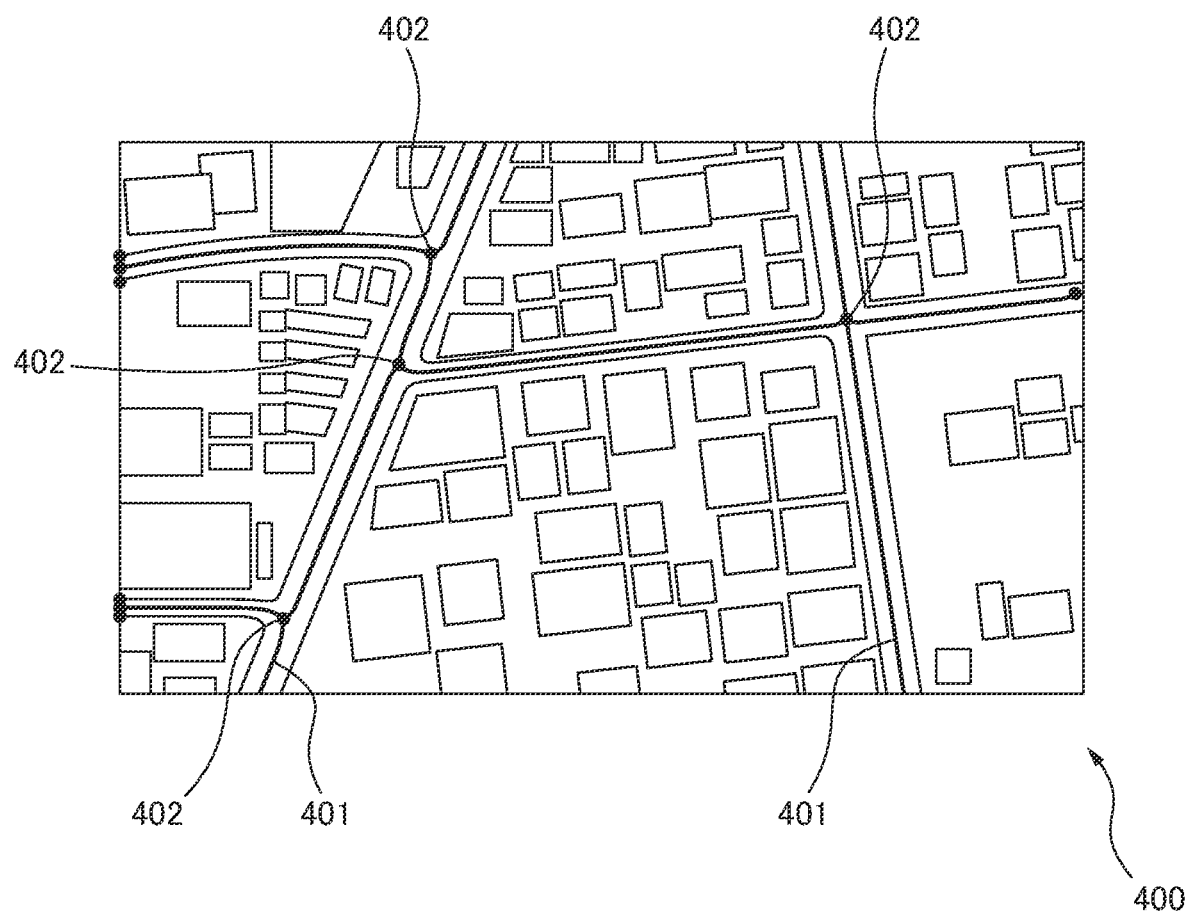
FIG. 4 is a diagram for briefly explaining detection of reference points of intersections by a skeletonizing or thinning process.

FIG. 4 is a diagram for briefly explaining detection of reference points of intersections by a skeletonizing or thinning process. As illustrated in FIG. 4, skeletonizing or thinning road areas represented in an image 400 yields a skeletonized or thinned network 401, in which nodes 402 of orders not less than three have appeared at individual intersections. This suggests that the nodes 402 can be set as reference points for detection of intersection areas.

Alternatively, the intersection area detection unit 12 may execute processing for creating a Voronoi tessellation on road areas with individual pixels representing road edges used as generators. In this case, Voronoi edges will be drawn close to the centers of respective roads, causing Voronoi points where Voronoi edges cross to appear at intersections.

Thus the intersection area detection unit 12 may set reference points at the Voronoi points. In this case also, the intersection area detection unit 12 can set a reference point in an intersection having no intersection mark, and thus appropriately set an intersection area for such an intersection.

The intersection area detection unit 12 notifies information indicating detected individual intersection areas in the image to the lane detection unit 13, the lane network generation unit 14, and the map generation unit 15.

The lane detection unit 13 detects, for each detected intersection area, at least either one of an entry lane for entering the intersection included therein and an exit lane for exiting the intersection, in each road connected to the intersection.

For example, when the length of a stop line of a road of interest is not greater than the value of the road width multiplied by a predetermined factor (e.g., 0.5), the lane detection unit 13 determines that the road includes both an entry lane and an exit lane. When the length of a stop line is greater than the value of the road width multiplied by the predetermined factor, the lane detection unit 13 determines that the road includes only an entry lane. The lane detection unit 13 can calculate the width of the road of interest as the distance between road edges in a direction substantially perpendicular to the lengthwise direction of the road. When lane lines are detected by one of the classifiers described above, the lane detection unit 13 determines that there are lanes as many as the number of divisions by these lane lines, for both entry lanes and exit lanes of the road of interest. Regarding a road having a stop line, the lane detection unit 13 may determine the numbers of entry lanes and exit lanes, depending on the positional relationship between the lane lines and the stop lines. For example, the lane detection unit 13 determines that one plus the number of lane lines on a road of interest which do not overlap any stop line in a direction substantially perpendicular to the lengthwise direction of the road is the number of exit lanes. The lane detection unit 13 also determines that one plus the number of lane lines on the road of interest which overlap a stop line in the substantially perpendicular direction is the number of entry lanes. Additionally, the lane detection unit 13 may determine a lane line within a predetermined range of the end of a stop line, in the substantially perpendicular direction, closer to the center of the road of interest as one to distinguish between entry lanes and exit lanes, and exclude it from the count of the numbers of entry lanes and exit lanes. The predetermined range is set, for example, to a size smaller than the width of a vehicle in the image.

When a single lane line is detected in a road having no stop line, the lane detection unit 13 may determine that this road includes two lanes divided by this lane line. Of these two lanes, the lane detection unit 13 may determine that one along which a vehicle is allowed to enter an intersection is an entry lane and the other is an exit lane, in accordance with the road law of the region represented in the image. Additionally, the lane detection unit 13 determines that a road where neither stop line nor lane line is detected (hereafter, referred to as a "lack-of-line road" for convenience of description) includes only an exit lane. Alternatively, the lane detection unit 13 may determine whether the lane of a lack-of-line road is an entry lane or an exit lane, based on the relationship between it and lanes included in another road connected to the same intersection. For example, the lane detection unit 13 determines that a lack-of-line road includes only an exit lane, when the intersection included in an intersection area of interest is a crossroads, the road opposite to the lack-of-line road with respect to a reference point has a stop line, and the opposite road includes only an entry lane. It may determine that a single lane included in a lack-of-line road of interest is one along which a vehicle is allowed to enter and exit the intersection included in an intersection area of interest, i.e., an entry and exit lane, when the intersection is a crossroads and the road opposite to the lack-of-line road of interest with respect to a reference point is also a lack-of-line road. Depending on the presence or absence of a stop line and the ratio of the length of the stop line to the road width in this way, the lane detection unit 13 can accurately detect entry lanes and exit lanes included in roads connected to an intersection.

The lane detection unit 13 notifies, for each intersection area, the numbers of entry lanes and exit lanes of each road connected to the intersection included in the intersection area to the lane network generation unit 14.

The lane network generation unit 14 generates, for each intersection area, a lane network representing the connection relationship between lanes in the intersection so as to connect, for each of the roads connected to the intersection included in the intersection area, the entry lane of the road to the exit lane of another of the roads connected to the intersection. In this way, information indicating the direction in which a vehicle is allowed to proceed on a lane-by-lane basis is obtained for each intersection.

Figure 5A:
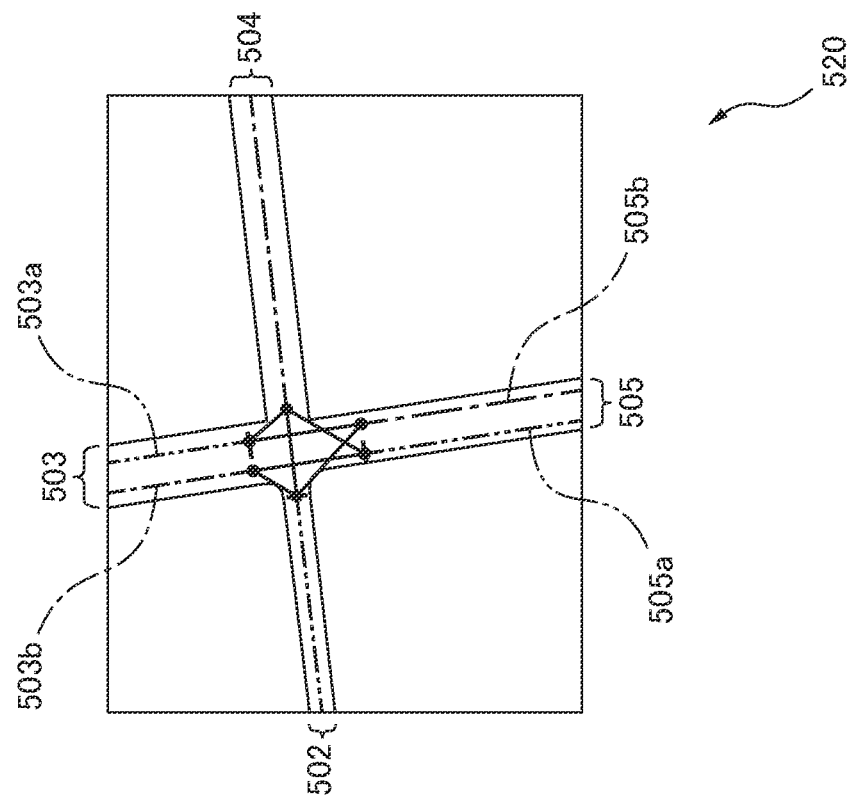
FIG. 5A illustrates an example of a generated lane network.
Figure 5B:
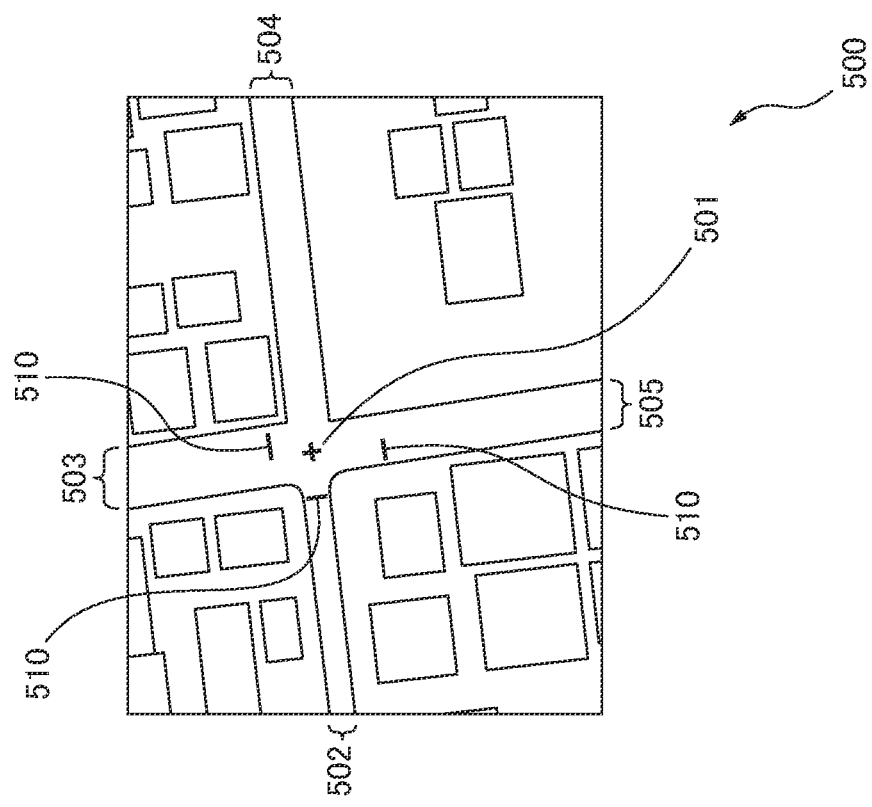
FIG. 5B illustrates an example of a generated lane network.

FIGS. 5A and 5B illustrate an example of a generated lane network. As illustrated in FIG. 5A, four roads 502 to 505 are connected to an intersection 501 represented in an image 500. Of these, the roads 502, 503, and 505 connected to the intersection 501 from the left, upper, and lower sides, respectively, have stop lines 510. Based on the lengths of the stop lines 510 and the widths of the roads, it is determined that the roads 503 and 505 each include an entry lane and an exit lane, and that the road 502 includes only an entry lane. The road 504 connected to the intersection 501 from the right side has no stop line, and it is determined that it includes only an exit lane.

Thus, in a lane network 520 illustrated in FIG. 5B, the entry lane of the road 502 is connected to the exit lanes of the roads 503 to 505. The entry lane 503*a* of the road 503 is connected to the exit lane of the road 504 and the exit lane 505*b* of the road 505. The exit lane 503*b* of the road 503 is connected to the entry lane of the road 502 and the entry lane 505*a* of the road 505. Similarly, the entry lane 505*a* of the road 505 is connected to the exit lane of the road 504 and the exit lane 503*b* of the road 503, and the exit lane 505*b* of the road 505 is connected to the entry lane of the road 502 and the entry lane 503*a* of the road 503. The exit lane of the road 504 is connected to the entry lanes of the roads 502, 503, and 505.

The lane network generation unit 14 notifies information indicating the lane network of each intersection area to the map generation unit 15.

The map generation unit 15 generates a road map including information indicating the lane network of each intersection area. Additionally, for each road detected from an image, the map generation unit 15 includes in the map the number of lanes included in the road and information on road markings formed on lanes.

At this inclusion, the map generation unit 15 may determine the positions of the intersections by referring to information indicating the geographical area represented in the target image for the map generation process and the positions of the respective intersection areas in the image, and associate positional information indicating the former positions (e.g., their latitudes and longitudes) with the road map. Similarly, the map generation unit 15 may divide each road into segments of a predetermined length, determine the positions of the segments by referring to information indicating the geographical area represented in the target image for the map generation process and the positions of the respective segments in the image, and associate positional information indicating the former positions with the road map.

Additionally, the map generation unit 15 may connect road maps generated on an image-by-image basis to generate a road map of a larger area. To this end, the map generation unit 15 refers to information indicating the geographical areas represented in individual images to connect road maps obtained from the respective images so that the same position of the same road may agree.

The map generation unit 15 stores the generated road map in the memory 5 or writes it to the storage medium 8 via the storage medium access device 6. Alternatively, the map generation unit 15 may output the generated road map to another device via the communication interface 2.

Figure 6:
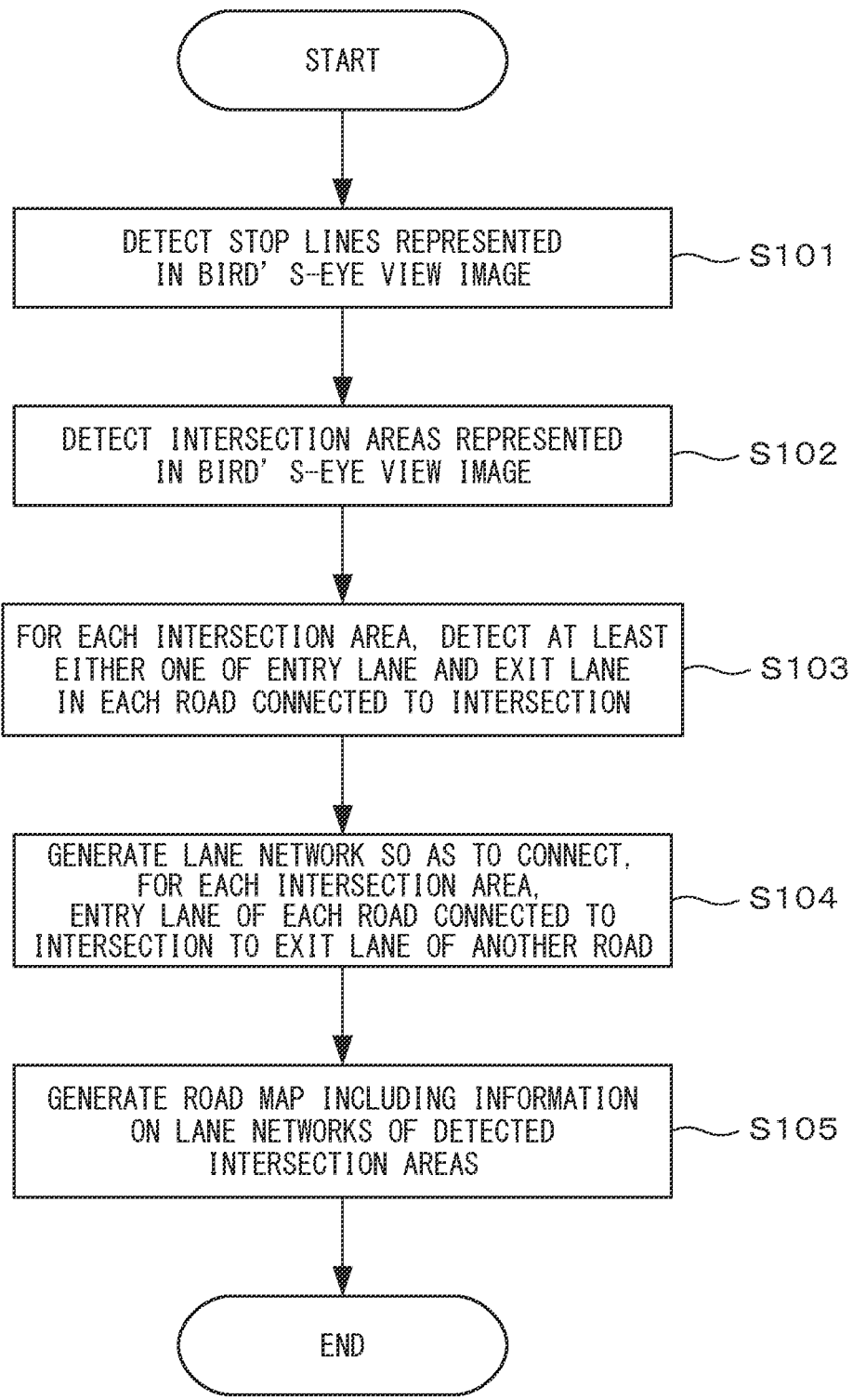
FIG. 6 is an operation flowchart of a map generation process.

FIG. 6 is an operation flowchart of the map generation process. The processor 7 executes the map generation process in accordance with the following operation flowchart for each bird's-eye view image that is a target for the map generation process.

The stop line detection unit 11 of the processor 7 detects individual stop lines represented in a bird's-eye view image (step S101). The intersection area detection unit 12 of the processor 7 detects individual intersection areas represented in the bird's-eye view image (step S102).

For each detected intersection area, the lane detection unit 13 of the processor 7 detects at least either one of an entry lane and an exit lane in each road connected to the intersection, based on the presence or absence of a stop line of the road and the ratio of the length of the stop line to the width of the road (step S103).

For each intersection area, the lane network generation unit 14 of the processor 7 generates a lane network so as to connect, for each of the roads connected to the intersection included in the intersection area, the entry lane of the road to the exit lane of another of the roads connected to the intersection (step S104).

The map generation unit 15 of the processor 7 generates a road map including information indicating the lane network of each intersection area (step S105). Then, the processor 7 terminates the map generation process.

As has been described above, the apparatus for generating a map detects individual intersection areas represented in a bird's-eye view image representing roads, and detects, for each detected intersection area, at least either one of an entry lane and an exit lane in each road connected to the intersection. For each intersection area, the apparatus then generates a lane network so as to connect, for each of the roads connected to the intersection, the entry lane of the road to the exit lane of another of the roads to which a vehicle is allowed to proceed from the entry lane of the road. In this way, the apparatus can automatically extract the connection relationship between travelable lanes of roads connected to an intersection, based on a bird's-eye view image.

In an intersection, an exit from a road connected thereto may be regulated by a signpost. In such a case, since what the signpost indicates is not represented in a bird's-eye view image, it is necessary to determine, for each road connected to the intersection, whether an exit from the road is allowed, without referring to the signpost.

Thus, according to a modified example, the lane network generation unit 14 may generate a lane network of an intersection area by inputting the intersection area into a classifier that has been trained to output, for each road connected to an intersection, the connection relationship between the entry lane of the road and an exit lane of another road to which a vehicle is allowed to proceed. As such a classifier, the lane network generation unit 14 may use, for example, a Graph Parsing Neural Network (GPNN). Alternatively, to obtain a feature vector to be inputted into a GPNN from the values of pixels included in an intersection area, the lane network generation unit 14 may use a variational autoencoder (VAE) or a DNN having a CNN architecture and including a position-sensitive ROI (PSRoI) pooling layer, such as a deformable convolutional network. The lane network generation unit 14 may use a feature map generated by inputting the values of pixels in an intersection area into any of these DNNs as a feature vector to be inputted into a GPNN.

According to this modified example, the lane network generation unit 14 can appropriately generate a lane network even if an exit from an intersection to a road connected thereto is regulated by a signpost.

A computer program for causing a computer to achieve the functions of the units included in the processor of the apparatus according to the embodiment or modified example may be provided in a form recorded on a computer-readable recording medium. The computer-readable recording medium may be, for example, a magnetic recording medium, an optical recording medium, or a semiconductor memory.

What is claimed is:

1. An apparatus for generating a map, comprising:
a processor configured to:
    detect a stop line of an intersection from a bird's-eye view image,
    detect from the bird's-eye view image an intersection area including an intersection and roads connected to the intersection,
    detect at least either one of an entry lane for entering the intersection and an exit lane for exiting the intersection in a road from which the stop line is extracted of the roads, based on the ratio of the length of the stop line to the width of the road, and
    generate a lane network representing a connection relationship between lanes in the intersection so as to connect, for each of the roads, the entry lane of the road to the exit lane of another of the roads to which a vehicle is allowed to proceed from the entry lane of the road.

2. The apparatus according to claim 1, wherein the processor is further configured to detect a reference point in the intersection from the bird's-eye view image, and the processor detects the intersection area so that the position where one of scan lines drawn radially from the reference point crosses the stop line is included in the intersection area.

3. The apparatus according to claim 2, wherein the processor detects a road marking indicating the intersection from the bird's-eye view image, and sets the reference point at the position where the detected road marking is represented.

4. The apparatus according to claim 2, wherein the processor extracts road areas representing roads from the bird's-eye view image, thins or skeletonizes the extracted road areas to generate a network representing a connection relationship between the roads, and sets the reference point at a node of an order not less than three in the generated network.

5. The apparatus according to claim 1, wherein the processor inputs the intersection area into a classifier to generate the lane network of the intersection area, the classifier having been trained to output, for each of the roads, a connection relationship between the entry lane of the road and an exit lane of another of the roads to which a vehicle is allowed to proceed from the entry lane of the road.

6. A method for generating a map, comprising:
- detecting a stop line of an intersection from a bird's-eye view image;
- detecting from the bird's-eye view image an intersection area including an intersection and roads connected to the intersection;
- detecting at least either one of an entry lane for entering the intersection and an exit lane for exiting the intersection in a road from which the stop line is extracted, of the roads, based on the ratio of the length of the stop line to the width of the road; and
- generating a lane network representing a connection relationship between lanes in the intersection so as to connect, for each of the roads, the entry lane of the road to the exit lane of another of the roads to which a vehicle is allowed to proceed from the entry lane of the road.

7. A non-transitory recording medium that stores a computer program for generating a map, the computer program causing a computer to execute a process comprising:
- detecting a stop line of an intersection from a bird's-eye view image;
- detecting from the bird's-eye view image an intersection area including an intersection and roads connected to the intersection;
- detecting at least either one of an entry lane for entering the intersection and an exit lane for exiting the intersection in a road from which the stop line is extracted, of the roads, based on the ratio of the length of the stop line to the width of the road; and
- generating a lane network representing a connection relationship between lanes in the intersection so as to connect, for each of the roads, the entry lane of the road to the exit lane of another of the roads to which a vehicle is allowed to proceed from the entry lane of the road.

* * * * *